United States Patent [19]

Reitze

[11] Patent Number: 4,512,168

[45] Date of Patent: Apr. 23, 1985

[54] KEY HOLDER

[76] Inventor: Frederick T. Reitze, 5532 S. Kenwood Ave., Chicago, Ill. 60637

[21] Appl. No.: 242,038

[22] Filed: Mar. 9, 1981

[51] Int. Cl.³ .............................................. A47G 29/10
[52] U.S. Cl. ................................... 70/456 R; 24/231; 206/37.1; 206/37.5
[58] Field of Search ................ 70/456 R, 456 B, 460, 70/457, 458, 459, 429, 430; 220/7; 206/38, 37, 490; 24/231; 59/85; 150/40

[56] References Cited

U.S. PATENT DOCUMENTS

| 1,053,848 | 2/1913 | Milcinsky . | |
|---|---|---|---|
| 1,161,529 | 11/1915 | Ringer . | |
| 1,423,147 | 7/1922 | Perry . | |
| 1,948,358 | 2/1934 | Reil | 70/456 R |
| 2,224,073 | 12/1940 | Augenstein | 70/459 |
| 2,485,051 | 10/1949 | Joslin | 70/456 R |
| 2,678,555 | 5/1954 | Van Buren, Jr. . | |
| 2,679,674 | 6/1954 | Hanna | 70/456 B |
| 2,737,046 | 3/1956 | Jancsics | 70/457 |
| 2,875,803 | 3/1959 | Greene et al. | 150/40 |
| 3,181,321 | 5/1965 | Gits | 70/456 R |
| 3,379,041 | 4/1968 | Hanna . | |
| 3,815,392 | 6/1974 | Laufer | 70/456 B |
| 3,826,118 | 7/1974 | Kruger | 70/456 B |
| 3,981,169 | 9/1976 | Youd . | |
| 4,037,439 | 7/1977 | Youd | 70/456 R |

FOREIGN PATENT DOCUMENTS

| 720198 | 10/1965 | Canada | 70/456 R |
|---|---|---|---|
| 1125991 | 11/1956 | France | 70/456 R |

Primary Examiner—Robert L. Wolfe
Assistant Examiner—Lloyd A. Gall
Attorney, Agent, or Firm—Emrich & Dithmar

[57] ABSTRACT

A key holder includes a circular housing including circular base and cover members riveted together centrally thereof and cooperating to define an annular chamber therebetween. Peripheral slots are equiangularly spaced apart around the perimeter of the housing in communication with the chamber, each slot having a narrow portion and an enlarged portion. A retainer clamped between the base and cover members has arms respectively resiliently engaging the cover member for closing the enlarged portions of the slots. Key hooks are respectively associated with the slots, each hook having an enlarged head which passes through the enlarged portion of the slot but not through the narrow portion thereof, the resilient arms of the retainer being deflectable by the key hook head for permitting insertion into and removal from the housing. Visual and tactile indicia are provided on the base member and/or the cover member for respectively designating the slots. Each key hook has a bent portion near the mounting head to permit it to hang vertically in the associated slot regardless of the orientation of the housing.

8 Claims, 10 Drawing Figures

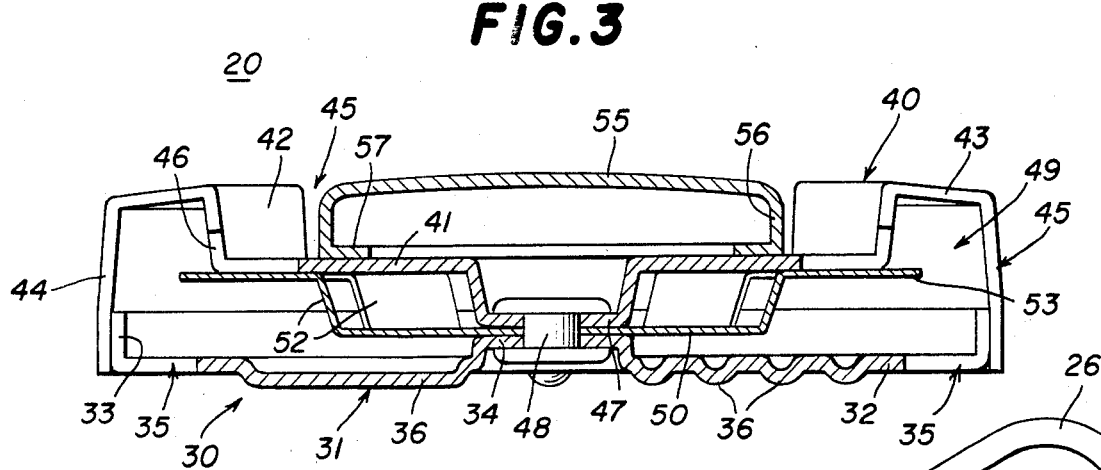
FIG.3
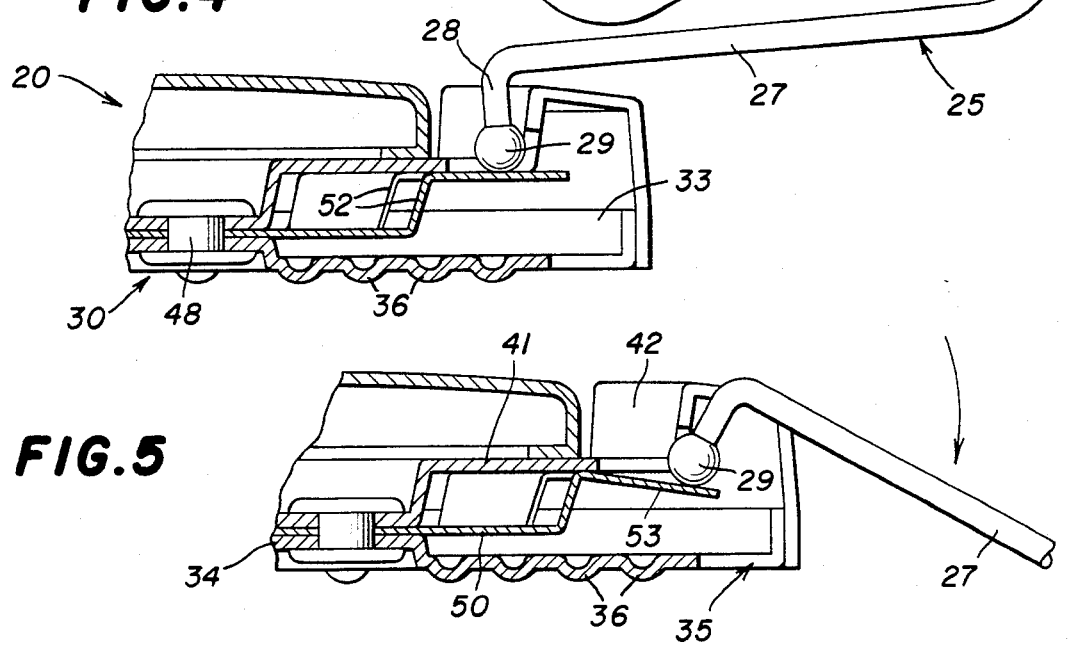
FIG.4
FIG.5
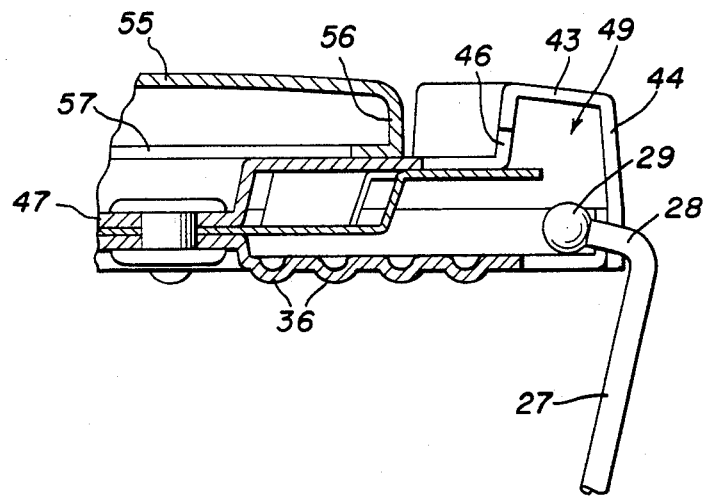
FIG.6

KEY HOLDER

BACKGROUND OF THE INVENTION

The present invention relates to key holders and, more particularly, to a key holder which carries a plurality of key hooks thereon and provides a separate position for each key hook.

Many types of key holders have heretofore been available, each having limitations in its use, suitability and appeal. Thus, for example, one type of key holder comprises a frame having a row of slots therein for respectively receiving key hooks, resilient retainers being provided to hold the key hooks in place and at the same time permit convenient mounting and demounting of the key hooks. This general type of key holder is illustrated in U.S. Pat. No. 2,678,555, issued May 18, 1954, and is commonly used in key cases which include flaps of material which wrap around the mounted keys and snap together to form an enclosure as illustrated, for example, in U.S. Pat. No. 3,379,041, issued on Apr. 23, 1968. But in this general type of key holder the keys are arranged in overlapping configuration within the case and have a tendency to bunch together and become entangled one with another, particularly when more than one key is mounted on each key hook. Furthermore, it can be very difficult to distinguish between the various key hooks in this type of holder, particularly in the dark.

There have also been provided circular keys holders which afford a plurality of separate locations for each key or key hook. Such circular arrangements are disclosed, for example, in U.S. Pat. No. 1,053,848, issued Feb. 18, 1913, U.S. Pat. No. 1,161,529, issued on Nov. 23, 1915, U.S. Pat. No. 1,423,147, issued July 18, 1922, U.S. Pat. No. 1,948,358, issued Feb. 20, 1934, and U.S. Pat. No. 3,981,169, issued Sept. 21, 1976. But in each of these circular arrangements the mounting and demounting of the individual keys and/or key hooks is difficult and cumbersome at best and, in certain instances the key hooks are not detachable from the holder.

SUMMARY OF THE INVENTION

It is a general object of this invention to provide an improved key holder which overcomes the disadvantages of prior art key holders while affording additional operating and structural advantages.

It is an important object of the present invention to provide an improved key holder which affords separate positions for each key or key hook, effectively preventing the keys from bunching together and permitting quick and easy selection of the desired key.

In connection with the foregoing object, it is another object of this invention to provide a key holder of the type set forth, which additionally permits quick and easy mounting and demounting of individual key hooks.

It is another object of this invention to provide a key holder which provides immediate access to all of the keys retained thereon.

Still another object of this invention is the provision of a key holder which can hang vertically from an individual key regardless of the orientation of that key.

Still another object of this invention is the provision of a key holder which affords various types of indicia respectively to designate the different key positions on the holder.

These and other objects of the invention are attained by providing a key holder comprising a circular housing having a plurality of receptacles formed therein and spaced apart circumferentially thereof, a plurality of key hooks respectively associated with the receptacles and each having a mounting portion receivable in the associated one of the receptacles, and resilient retaining means carried by the housing and normally cooperating therewith to close the receptacles, the retaining means being deflectable upon engagement therewith by one of the key hook mounting portions for opening one of the receptacles to permit the mounting portion to be inserted into and removed from the one receptacle.

The invention consists of certain novel features and the combination of parts hereinafter fully described, illustrated in the accompanying drawings, and particularly pointed out in the appended claims, it being understood that various changes in the details may be made without departing from the spirit, or sacrificing any of the advantages, of the invention.

BRIEF DESCRIPTION OF THE DRAWINGS

FIG. 3 is an enlarged view in vertical section taken along the line 3—3 in FIG. 1;

FIG. 4 is a fragmentary view of the right-hand side of the key holder as illustrated in FIG. 3, and illustrating a key hook in position for insertion into a corresponding slot of the key holder housing;

FIG. 5 is a view similar to FIG. 4, and illustrating the key hook partially inserted into the housing;

FIG. 6 is a view similar to FIGS. 4 and 5, and illustrating the key hook after insertion into the corresponding slot of the housing;

DESCRIPTION OF THE PREFERRED EMBODIMENTS

Figure 1:
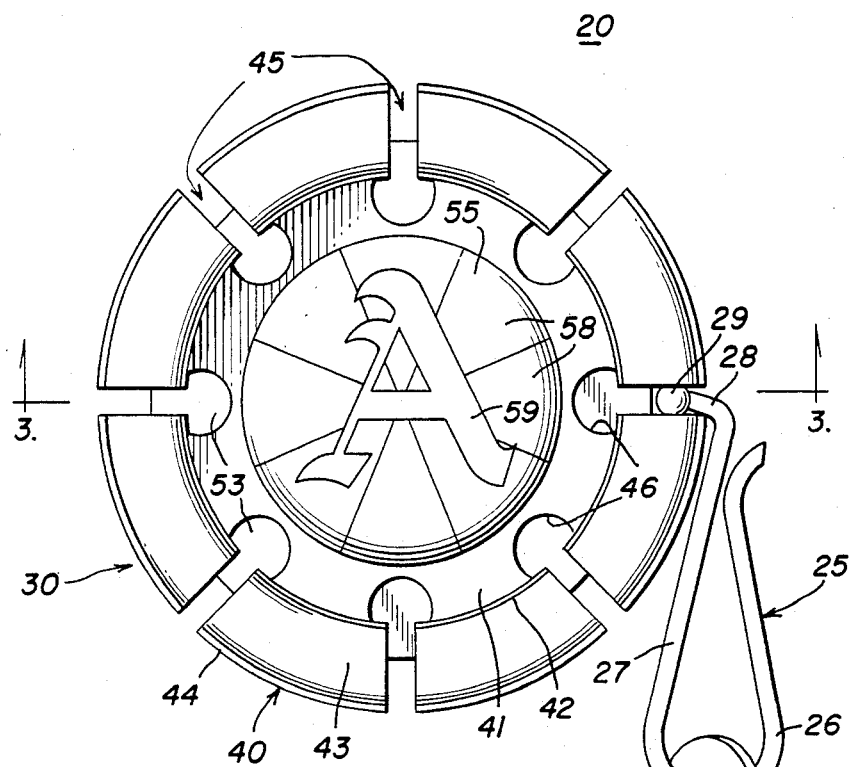
FIG. 1 is a top plan view of a key holder constructed in accordance with and embodying the features of the present invention, and illustrating a single key hook mounted thereon.
Figure 2:
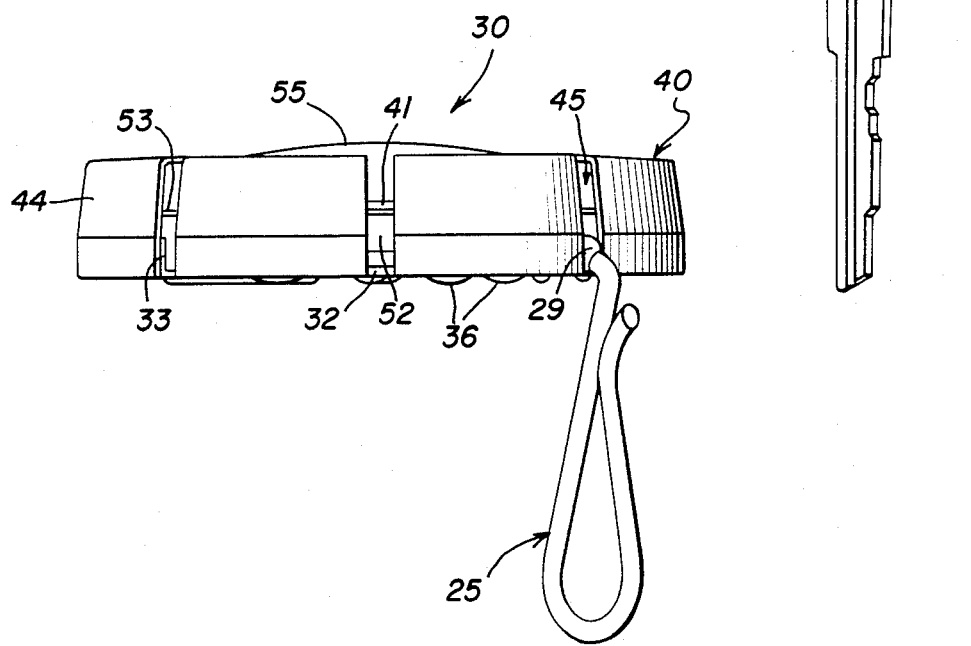
FIG. 2 is a front elevational view of the key holder of FIG. 1, with the key hook disposed in a different slot.
Figure 7:
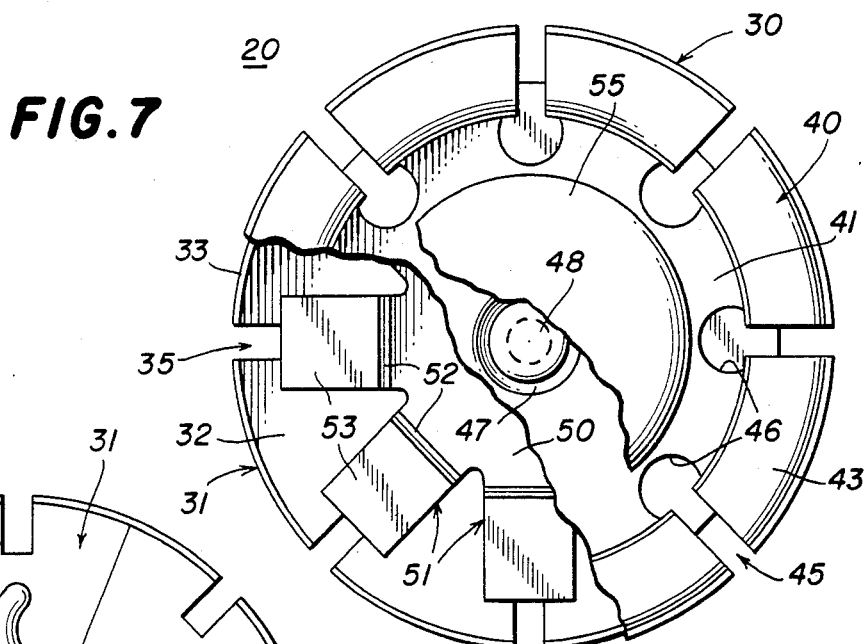
FIG. 7 is a view similar to FIG. 1, but with portions of the cover member and cap of the key holder housing broken away more clearly to show the internal construction of the key holder.
Figure 8:
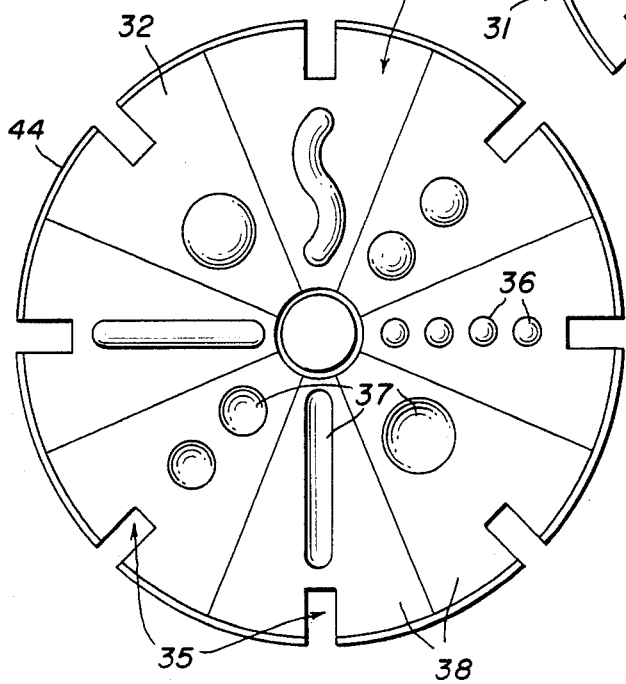
FIG. 8 is a bottom plan view of the key holder of FIG. 1, with key hooks removed therefrom.

Referring now to FIGS. 1 through 3, 7 and 8 of the drawings, there is illustrated a key holder generally designated by the numeral 20, constructed in accordance with and embodying the features of the first embodiment of the present invention. The key holder 20 is adapted for retaining thereon a plurality of keys 21, with at least one such key mounted on each of a plurality of key hooks, one of which is illustrated and is generally designated by the numeral 25. Each key hook 25 has a loop 26 continuous with a shank 27 which has a portion 28 at the end thereof bent at approximately a ninety degree angle and terminating in an enlarged mounting ball 29.

The key holder 20 includes a housing, generally designated by the numeral 30, which includes a generally circular base member 31 and a generally circular cover 40 and a circular retainer 50 therebetween, all arranged coaxially and secured together centrally thereof. More specifically, the base member 31 has a bottom wall 32 integral at the outer edge thereof with an upstanding cylindrical side wall 33. The bottom wall 32 has a raised flat planar central portion 34 centrally thereof. Formed in the base member 31 at the periphery thereof are a plurality of generally radially inwardly extending slots 35, each of the slots 35 extending downwardly through the side wall 33 and radially inwardly a predetermined distance into the bottom wall 32. Each slot 35 is generally rectangular in shape, the slots 35 being equiangularly arranged around the base member 31.

Figure 9:
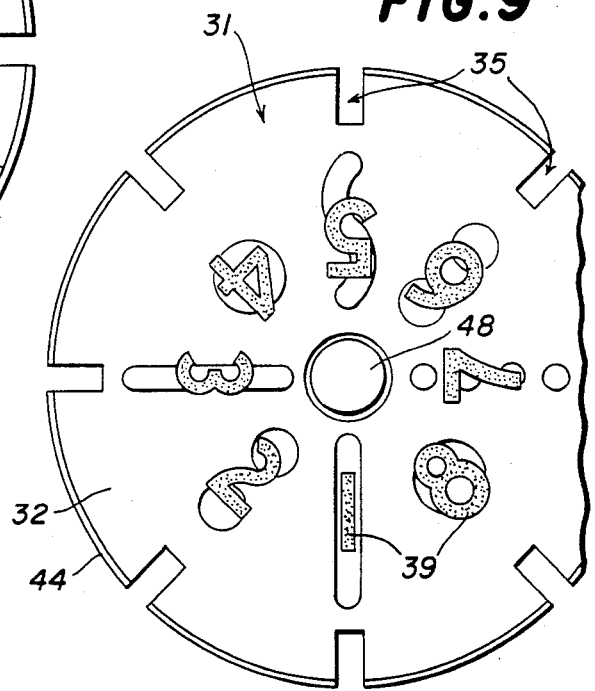
FIG. 9 is a fragmentary view similar to FIG. 8 of an alternative version of the base member of the key holder housing having a different arrangement of indicia thereon.

The bottom wall 32 may be provided with a plurality of tactile indicia thereon, such as projections 36 and indentations or depressions 37. More particularly, the indicia are respectively arranged opposite the slots 35 for respectively designating the slots 35 and permitting the slots to be distinguished from one another in the dark. In addition, the outer surface of the bottom wall 32 may be divided into a plurality of equal sectors (see FIG. 8), each containing one of the slots 35 and each bearing a different color to facilitate daylight differentiation among the several slots 35. Alternatively, referring to FIG. 9, indicia 39 such as Arabic numerals may respectively be associated with the slots 35 along the outer surface of the bottom wall 32.

The cover 40 includes a top wall 41 forming a first depressed flat planar portion and integral at the outer edge thereof with an upstanding cylindrical wall 42 which is in turn integral at its upper edge with a radially outwardly extending annular wall portion 43. The annular wall portion 43 is continuous at its outer edge with a downwardly extending cylindrical side wall 44. Formed in the cover 40 at equiangularly spaced-apart points therealong are a plurality of slots, each generally designated by the numeral 45. Preferably, each of the slots 45 extends generally radially inwardly of the cover 40 and includes a narrow rectangular portion extending inwardly through the peripheral side wall 44 and the annular wall portion 43 and downwardly along a portion of the cylindrical wall 42, and an enlarged part-circular portion 46 which extends inwardly a predetermined distance along the top wall 41. Formed centrally of the cover 40 is a second depressed flat planar portion.

In use, the central portion of the retainer 50 is disposed between the recessed circular portions 34 and 47 of the base member 31 and the cover 40, the three parts being fixedly secured together as by a rivet 48 in an assembled configuration, best illustrated in FIG. 3. In this assembled configuration, the side wall 44 of the cover 40 overlaps the side wall 33 of the base member 31 in surrounding telescopic relationship therewith, the base member 31 and the cover 40 cooperating to define therebetween an annular chamber 49. The slots 35 in the base member 31 are equal in number to the slots 45 in the cover 40 and are arranged respectively in alignment therewith, the width of each slot 35 being substantially identical to the width of the narrow portion of the corresponding slot 45.

The retainer 50 comprises a generally circular body of spring steel which has a plurality of radially outwardly extending arms 51 thereon, each of the arms 51 including an upwardly inclined shoulder portion 52 terminating at the upper end thereof in a radially outwardly extending end portion 53. The retainer 50 is arranged so that the end portions 53 of the arms 51 respectively normally resiliently bear against the top wall 41 of the cover 40 for respectively covering the enlarged portions 46 of the slots 45. It will be noted that each of the end portions 53 extends radially outwardly beyond the cylindrical wall 42 of the cover 40, but is spaced from the side wall 44 a predetermined distance greater than the diameter of the mounting ball 29 of the key hook 25.

The cover 40 is provided with a generally circular cap 55 provided with a cylindrical side wall 56 terminating at the lower edge thereof with a radially inwardly extending annular attachment flange 57 adapted to be fixedly secured by any suitable means to the outer surface of the top wall 41 of the cover 40 coaxially therewith. The cap 55 thereby provides a decorative covering for concealing the rivet 48. Additionally, the top surface of the cap 55 may be divided into a number of identical sectors, each of which defines an angle which includes a corresponding one of the slots 45 thereon. Each of the sectors may bear a different color as at 58 to provide ready distinction among the several slots 45. Additionally, if desired, the cap 55 may bear indicia 59 thereon, such as the user's initial or the like.

In operation, each of the combined slots 45 and 35 cooperates with the adjacent portion of the chamber 49 and the corresponding one of the retainer arms 51 to form a receptacle for one of the associated key hooks 25. More specifically, the enlarged portions 46 of the slots 45 are dimensioned so that the mounting ball 29 of the key hook 25 can pass therethrough, but the slots 35 and the narrow portions of the slots 45 are dimensioned so that the shank 27 and bent portion 28 of the key hook 25 will pass therethrough, but the mounting ball 29 will not pass therethrough.

When it is desired to mount a key hook 25 in the housing 30, the mounting ball 29 of the key hook 25 is positioned over the enlarged portion 46 of one of the slots 45, as illustrated in FIG. 4, in engagement with the underlying one of the retainer arm end portions 53. The key hook 25 is then pushed downwardly, deflecting the retainer arm end portion 53 downwardly away from the top wall 41 of the cover 40, as illustrated in FIG. 5, to allow the mounting ball 29 to pass into the chamber 49, as illustrated in FIG. 6, the retainer arm end portion 53 thereafter snapping back into its normal position against the cover top wall 41 to reclose the enlarged portion 46 of the slot 45 and prevent accidental removal of the key hook 25 therefrom. Thus, it will be appreciated that the key hook 25 is now securely retained in the corresponding slot of the housing 30. If it is desired to remove the key hook 25 from the housing 30, the mounting ball 29 is lifted back up onto the distal end of the retainer arm end portion 53 for deflecting it downwardly and allowing the mounting ball 29 to be passed back through the enlarged portion 46 of the slot 45.

It is a significant feature of the present invention that the bent portion 28 of the key hook 25 cooperates with the slots 35 and 45 to permit the key hook 25 to be moved through nearly 360 degrees in the direction of the arrow in FIG. 5. This permits the key holder 20 and the keys mounted therein to be laid flat on a horizontal surface and it also permits the housing 30 to hang vertically from one of the keys 21 mounted thereon, regardless of the orientation of that key. It is another important feature of this invention that the slots of the housing 30 form discrete separate receptacles for the key hooks 25 which prevent the keys from being jammed together and entangled with one another. Furthermore, these discrete receptacles, together with the visual and tactile indicia on the bottom wall 32 and the cap 55 facilitate ready differentiation among the several slots in daylight or darkness to facilitate location of a specific key. Additionally, the slot and retainer arrangement of the key holder 20 permits simple and easy mounting and demounting of the key hooks 25 in the housing 30.

Figure 10:
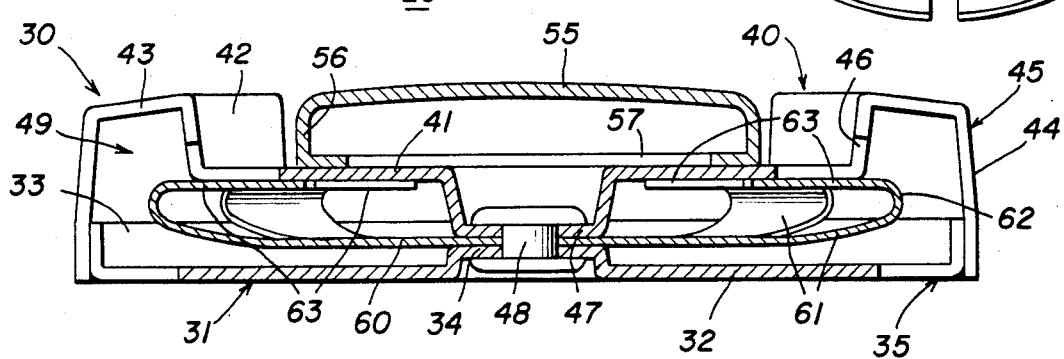
FIG. 10 is a view in vertical section similar to FIG. 3, and illustrating an alternative form of retainer.

Referring now also to FIG. 10 of the drawings, there is illustrated an alternative embodiment of the present invention which is identical to that illustrated in FIG. 1 with the exception that there is provided an alternative form of retainer, generally designated by the numeral 60. The retainer 60 is similar to the retainer 50, comprising a circular body of spring metal having a plurality of resilient arms 61 extending radially outwardly therefrom and equal in number to the slots 45. Each of the arms 61 is folded back upon itself, forming a curved elbow 62 and an overlapping end portion 63 which covers the enlarged portion 46 of a corresponding one of the slots 45, resiliently bearing against the inner surface of the cover top wall 41 for this purpose. For mounting and demounting of a key hook 25 in the housing 30, the arms 61 are resiliently deflectable in the same manner as was described above with respect to the arms 51 in FIGS. 4-6. In all other respects, the operation of the key holder illustrated in FIG. 10 is identical to that illustrated in FIG. 1.

From the foregoing, it can be seen that there has been provided an improved key holder of simple and economical construction which provides separate receptacles for key hooks, simple and easy mounting and demounting of the key hooks and ready identification of the different key hook locations in daylight or darkness.

What is claimed is:

1. A key holder comprising a free self-contained circular housing; said housing including a base member having a flat circular bottom wall and a peripheral base side wall integral with said bottom wall around the perimeter thereof and projecting therefrom, said bottom wall having a raised flat planar central portion, a cover member having a circular top wall and a peripheral cover side wall integral with said top wall around the perimeter thereof and projecting therefrom, said top wall having a first depressed flat planar portion centrally thereof, said first depressed portion having a second further depressed flat planar portion centrally thereof, said cover member being disposed over said base member coaxially therewith with said cover side wall overlapping said base side wall around the entire circumference thereof and with said second depressed portion overlying said raised central portion parallel thereto, and attachment means fixedly securing said second depressed portion to said raised central portion for securing said cover member to said base member, said cover member cooperating with said base member to form a substantially closed annular chamber bounded on the outer periphery thereof by said overlapping side walls and bounded on the inner periphery thereof by said raised central portion and said second depressed portion, said housing having a plurality of simultaneously accessible peripheral slots therein spaced apart circumferentially thereof and communicating with said chamber and extending radially into said base member and said cover member for cooperation with said chamber to define a plurality of discrete receptacles, each of said slots having an enlarged portion extending into said first depressed portion and a narrow portion; a plurality of key hooks, each of said key hooks having a shank portion dimensioned to pass through the narrow portions of said slots and an enlarged mounting portion dimensioned to pass through the enlarged portions of said slots but to be unable to pass through the narrow portions of said slots; and a retainer in said housing between said cover member and said base member, said retainer having a central attachment portion clamped between said second depressed portion and said raised central portion, and a plurality of resilient portions carried by said attachment portion and engageable with said first depressed portion of said cover member for respectively closing said enlarged portions of said slots, each said resilient portion being deflectable by said mounting portion of one of said key hooks for opening said enlarged portion of the corresponding one of said slots to permit insertion of said mounting portion into said chamber and removal of said mounting portion from said chamber for mounting and demounting said key hook with respect to said housing.

2. The key holder of claim 1, wherein said base member has a plurality of indicia thereon respectively designating said slots.

3. The key hook holder of claim 1, wherein said indicia include tactile indicia.

4. The key hook holder of claim 2, wherein said indicia include visual indicia including a plurality of different colors.

5. The key holder of claim 1, wherein said housing and said retainer are formed of metal.

6. The key holder of claim 1, wherein each of said receptacles is dimensioned and arranged for accommodating a single key hook mounting portion therein.

7. The key holder of claim 1, wherein said retainer has a plurality of radially extending arms respectively defining said resilient portions, each of said radial arms being folded back upon itself to form a radially inwardly extending end portion resiliently engageable with said first depressed portion of said cover member.

8. The key holder of claim 1, and further including a cap member disposed in said first depressed portion of said cover member and covering said second depressed portion and carrying indicia thereon for respectively designating said slots.

* * * * *